Patented Apr. 30, 1946

2,399,286

UNITED STATES PATENT OFFICE 2,399,286

UNSATURATED ESTERS AND POLYMERS THEREOF

Irving E. Muskat, Glenside, Pa., and Franklin Strain, Norton Center, Ohio, assignors to Pittsburgh Plate Glass Company, Pittsburgh, Pa., a corporation of Pennsylvania No Drawing. Application November 25, 1942, Serial No. 466,948

8 Claims. (Cl. 260—78)

This invention relates to a new group of unsaturated esters and the polymers which have valuable properties as herein described. The esters are complex compounds in which simple polyhydroxy ethers having an ether linkage between a pair of hydroxyl groups are esterified with one acid group of each of two or more carbonic acid molecules, the other acid group of the carbonic acid molecules being esterified with an ester of a simple alpha-hydroxy carboxylic acid and an unsaturated alcohol. The new esters may be represented by the structural formula

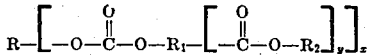

in which R is the organic radical derived by esterification from the simple hydroxy ether having $x$ hydroxyl groups, $R_1$ is an organic radical to which the hydroxy and $y$ carboxylic acid groups of the alpha-hydroxy acid are attached and $R_2$ is the radical derived by the esterification of an unsaturated alcohol.

By "ester linkage" we mean a linking oxygen atom derived by interaction of an hydroxy group with an acid group. Thus, a carbonate (R—O—CO—O—R)

contains two ester linkages.

By "simple polyhydroxy ether" we mean a polyhydroxy ether which does not contain any ester linkages between the hydroxyl groups. Thus, the compound

although it does contain an ether linkage, is not a simple polyhydroxy ether because it contains an ester linkage.

Suitable polyhydroxy ethers are the di-, tri-, and tetraethylene glycols, di-, tri-, and tetrapropylene glycols, di-, tri-, and tetrabutylene glycols, the corresponding polyamylene glycols, etc., the polyglycerols and other polymers of simple polyhydroxy compounds made by dehydration processes.

By "simple alpha-hydroxy carboxylic acid" we mean a compound which contains a single hydroxy group in the alpha position and at least one carboxyl group and which does not have an ester linkage within the molecule and between the reactive hydroxyl. Thus, the compound lactyl lactic acid

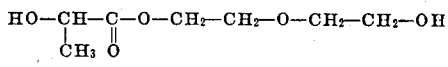

is not a simple monohydroxy acid. Suitable simple hydroxy acids are glycolic, lactic, α-hydroxy butyric, leucinic, valerolactinic, acetonic, isomalic, citramalic, malic, citric, and α-hydroxy n-caproic acids.

The new compounds are preferably the esters of unsaturated alcohols having up to five carbon atoms and an unsaturated linkage in an aliphatic chain such as vinyl, allyl, methallyl, 2-chloroallyl, crotyl, tiglyl, chlorocrotyl, bromoallyl, ethylallyl, propargyl, and angelyl alcohols, methyl vinyl carbinol. Esters of alcohols having six to ten carbon atoms are also useful such as geranyl, cinnamyl, phenylpropargyl and β-propyl allyl alcohols.

The new esters may be prepared by treating the simple polyhydroxy ethers with an excess of phosgene to form polychloroformates such as diethylene glycol bis chloroformate, dipropylene glycol bis chloroformate, etc., which are subsequently reacted with esters such as methallyl lactate, allyl α-hydroxy butyrate, dicinnamyl citramalate. The chloroformates preparation is preferably conducted at temperatures between 0° C. and 20° C. maintained by cooling during the reaction, by bubbling the phosgene through the polyhydroxy compound or through a solution of it in suitable solvents such as benzene, ether, carbon tetrachloride, or petroleum ether. The esterification may be conducted at low temperatures, preferably below 20° C. by adding the chloroformate to a mixture of the unsaturated alcohol esters of simple alpha-hydroxy acids and an alkaline reagent such as pyridine or other tertiary cyclic amine or a carbonate, oxide, or hydroxide of an alkali or alkaline earth metal. When an insoluble alkaline reagent such as calcium carbonate is used, it is frequently necessary to use elevated temperatures, for example, 50 to 80° C., in order to induce a practicable rate of reaction. When strongly alkaline reagents such as sodium hydroxide are used, it may be desirable to reverse the preferred method of combining the reagents by adding a mixture of the alcohol and the alkali to the chloroformate, thereby preventing a large excess of strong alkali from contacting the ester being synthesized.

The same new esters may alternatively be prepared by treating the unsaturated alcohol esters of the monohydroxy acids with phosgene to form the corresponding chloroformates. The reaction is preferably conducted at temperatures of 0 to 20° C. maintained by an ice bath or other cooling means and may be conducted in the presence of a diluent such as benzene, etc. The chloroformates are subsequently treated with the simple polyhydroxy compound in the presence of an alkaline reagent such as pyridine and preferably at temperatures between 0° C. and 20° C. to form the new esters.

The new unsaturated carbonates are generally non-resinous compounds having distinct boiling and melting points and are often capable of isolation in substantially pure state. Frequently, the impurities are side reaction products which are colorless and transparent esters having characteristics similar to the esters herein contemplated. In such cases, removal of said impurities may be unnecessary unless they produce a detrimental effect in the use to which the ester is put. The new compounds are usually liquids at normal temperatures but some, however, are solids. The new unsaturated compounds are usually miscible with solvents such as benzene, toluene, chloroform, diethyl ether, carbon tetrachloride and petroleum ether. The monomeric esters are valuable as plasticizers for various resin materials such as styrene, cellulose, vinyl, urea, protein, phenolic, or acrylic resins. Other uses such as for solvents, insecticides, and liquid coating compositions are noteworthy.

These esters may be polymerized in the presence of heat, light, or catalysts such as oxygen, ozone, or organic peroxides such as lauroyl, benzoyl, or acetone peroxides, to yield solid or liquid compositions of widely differing physical properties. The polymerized products vary in properties, depending upon the structure of the ester and upon the degree of polymerization.

These polyunsaturated esters are capable of polymerization to a fusible intermediate stage and finally to a substantially infusible and insoluble polymer. The ultimate polymers of these new compounds are generally highly resistant to acids, alkalies, water, and organic solvents. The polymers thus obtained are usually colorless and transparent, although in some instances they may be slightly yellow when polymerized completely. Many of these polymers are tough and quite resistant to shattering.

Upon the initial polymerization of the polyunsaturated esters in the liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or fusible soluble polymer. These gels are soft and bend readily. However, they are fragile and crumble or tear under low stresses. They may be further polymerized in the presence of catalysts to the final infusible insoluble state in which substantially all of the polymer is infusible and insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide, temperatures of 65 to 80° C. are suitable, while for acetone peroxide temperatures of 140–150° C. may be used. In accordance with one modification, the gel, after it is freed from the mold, may be coated on both sides with monomer or the syrupy polymer. The coated article is then polymerized between smooth heated plates to the final insoluble state.

Other intermediate polymers of a more advanced state of polymerization may be prepared by continuing the heating of a soft gel which contains residual peroxide. These may be hard at normal room temperatures and may contain appreciable quantities of both the acetone soluble and acetone insoluble polymers. These advanced polymers become more flexible at higher temperatures and may be shaped after heating. Preferably, the shaping does not exceed the elastic limit of the material. The flexible sheet is held in its flexed position in a mold or other shaping device until cooled to the normal room temperature. A permanently shaped resin is thereby formed which may contain simple or complex curvatures.

Cast polymers may also be prepared by a single step polymerization directly to the insoluble state. The monomer may be mixed with one to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (plasticized polyvinylchloride), butadiene polymers, polyvinyl alcohol, Thiokol (polyethylene sulfide), rubber, or similar materials arranged about the edge of such plates. The thickened monomer may be poured on one glass plate within the confines of the flexible retainer, laid about 2 inches from the edge of the plate. The second glass plate may then be carefully laid on top, taking care to avoid the trapping of air bubbles under the top plate. When the top plate is in position, both plates may be held together by means of suitable clamps which are capable of applying pressure upon the plates directly over the flexible retainer. The entire assembly is then placed in an oven and heated at 70 to 100° C. where the polymerization is continued. During the polymerization the resin shrinks and tends to draw away from the glass surfaces. To prevent fractures pressure is maintained upon the plates to depress the flexible container and minimize or prevent lateral or longitudinal shrinkage while the resin is polymerized within the mold. This pressure may be maintained by periodically tightening the clamps or by use of spring clamps which maintains a uniform pressure throughout the polymerization process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent to the edge of the plates and a suitable opening may be provided between the ends of the flexible retainer, preferably at one corner of the mold. The assembled mold is then placed in a vertical position with the open corner uppermost. The thickened monomer containing up to five percent residual peroxide is then poured in slowly until the entire mold is filled. After standing until all of the entrapped air has separated the mold is sealed and heated uniformly between 70 and 100° C. to continue the polymerization. Pressure is maintained upon the plates to prevent lateral or longitudinal shrinkage of the resin during polymerization by suitable means such as by tightening the clamps periodically or by maintaining a uniform pressure upon the plates throughout by means of spring clamps. When the resin has been completely polymerized it is separated from the glass plates and a hard, transparent, colorless, and durable resin sheet is obtained.

Other methods have been developed for polymerization of the compounds herein contemplated while avoiding formation of cracks and fractures. By one of these methods, the polymerization may be suspended while the monomer-polymer mixture is in the liquid state and before the polymer is converted to a gel by cooling, by removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. The fusible polymer is thus obtained in stable solid form and as such may be used as a molding powder or may be redissolved in suitable solvent for use in liquid form. It is soluble in organic solvents such as benzene, chloroform, ethyl acetate, acetone, toluene, etc. Preferably, the polymers of the new esters are produced by heating the monomer or a solution thereof in the presence of substantial quantities, for example, up to 5 percent of benzoyl peroxide until the viscosity of the solution has increased about 100 to 500 percent. This may require several hours while heating at 65 to 85° C. in the presence of benzoyl peroxide. The resulting viscous solution is poured into an equal volume of water, methyl or ethyl alcohols, glycol, or other non-solvent for the fusible polymer. A polymer usually in the form of a powder or a gummy precipitate is thus formed which may be decanted or filtered and then dried. This permits substantially complete separation of a soluble fusible polymer from unpolymerized monomer.

Often, however, a complete separation of monomer and polymer is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, such a composition may contain soluble fusible polymer in an amount up to 50 or 60 percent. Preferably, the production of these materials is conducted by treatment of a solution of the monomer in a solvent for monomer and intermediate polymer such as benzene, xylene, toluene, carbon tetrachloride, acetone, chloroform, ethyl acetate, etc.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions.

Other fusible polymers may be prepared by carrying the initial polymerization to the point where the polymer is in the form of a gel which generally contains at least 20 percent and preferably about 45 to 90 percent by weight of substantially insoluble polymer, but at which point the gel is still fusible. This solid resin composition may be disintegrated to a pulverulent form and used as a molding powder. Alternatively a desirable polymer may be prepared in an aqueous medium with or without a suitable emulsification agent such as polyvinyl alcohol, polyallyl alcohols, etc., and then be further polymerized to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers, or pigments such as zinc oxide, calcium carbonate, lead chromate, magnesium carbonate, calcium silicate, etc. and plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The soluble fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl cellosolve, dichloroethyl ether, dibutyl phthalate, or mixtures thereof, is useful as a liquid coating composition. Objects of paper, metal, cloth, wood, leather, or synthetic resins may be coated with the solution of polymer in solvent and subsequently polymerized to yield attractively finished coatings. Similarly, porous objects of felt, cloth, leather, paper, etc., either in single layers or laminated, may be impregnated with the dissolved fusible polymer and subjected to the polymerization to the final insoluble infusible state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions, a dry pulverulent powder can be obtained which is capable of polymerization under the influence of heat and pressure to a glossy solid polymer of high tensile strength. The use of too much filler may cause a non-glossy finish and the use of too much monomer may make the powder moist and difficult to handle. Sometimes it may be desirable to precure the molding powder by subjecting it to a moderate temperature, 50 to 70° C., for a limited period of time, for example, one to three hours. This precuring operation is a partial polymerization and permits a dry molding powder where the same proportions of monomer might result in a moist molding composition.

Further details of the synthesis of these new esters and of their applications will be apparent from the following examples:

Example I

Allyl lactate was prepared by heating a mixture of 739 cc. of 85 percent lactic acid, 2041 cc. of allyl alcohol, 9 grams of p-toluenesulphonic acid and 1000 cc. of carbon tetrachloride on an oil bath for 24.5 hours at reflux temperatures. The condensate was divided into the two liquid phase fractions and the nonaqueous phase was returned to the reaction flask. The allyl lactate was distilled at 96° C. (30 mm.). One hundred and twenty grams of diethylene glycol dichloroformate was cooled to +5° C. and added slowly (3 to 4 grams per minute) to a mixture of 100 grams of allyl lactate and 85 grams of pyridine. The reaction flask was equipped with a mechanical stirring device and was surrounded by a bath of a salt-ice freezing mixture. During the reaction the temperature within the flask did not rise above 16° C. When the reaction was completed the ester was washed with dilute hydrochloric acid and with water until neutral. It was a clear liquid believed to have the structure:

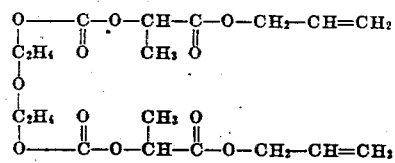

A ten-gram sample was mixed with 0.3 gram of lauroyl peroxide and heated at 75° C. for two hours. A hard, light-colored polymer was produced.

Example II

Methallyl lactate was prepared by the method described in Example I, except that methallyl alcohol was used in place of allyl alcohol and that the p-toluenesulphonic acid was not added. One hundred and fifty grams of methallyl lactate was mixed with 500 cc. benzene and treated by bubbling gaseous phosgene through it while maintaining a temperature within the reaction vessel of +3 to +8° C. by means of an ice bath. An intimate mixture of reactants was secured by mechanical agitation. The phosgene was added at a rate slow enough to maintain the desired reaction temperature. The chloroformate was washed with water and distilled. The purified chloroformate of methallyl lactate was cooled to +5° C. and added at the rate of 2 to 3 grams per minute to a mixture of 100 grams of triethylene glycol, 600 cc. of benzene, and 90 grams of pyridine. The reaction mixture was agitated to insure the contact of reactants. During the reaction the temperature remained between +5 and +17° C. due to the presence of an ice bath. The benzene solution was washed with N/10 hydrochloric acid and then with water until neutral. The solution was dried over anhydrous sodium sulphate. The benzene solution was distilled and the new esters were recovered as a water-white substantially pure liquid. The ester was believed to have the following structure:

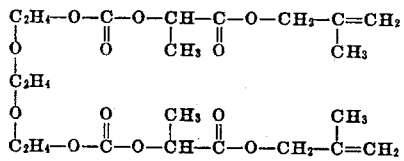

Example III

A mixture of 200 grams of chloroallyl alcohol, 160 grams of glycolic acid, 2 grams of phenolsulphonic acid, and 500 cc. benzene was heated for 30 hours on an oil bath. The water evolved in the reaction was evaporated and condensed with the benzene. The condensate was separated into two liquid phases and the benzene phase was returned to the reaction vessel. When the reaction was complete the benzene solution was washed with Na₂CO₃ solution, with hydrochloric acid, and with water. The ester was separated from the benzene by distillation at reduced pressures. The purified ester (100 grams) was mixed with 97 grams of dipropylene glycol chloroformate and 500 cc. benzene and cooled to +2° C. Seventy cc. of 50% NaOH was added dropwise at a rate which enabled the maintenance of the reaction temperature below +12° C. The reaction mass was stirred vigorously and provided with an ice bath for cooling. The benzene solution was washed with water, with hydrochloric acid and finally again with water until neutral. The solution was dried over sodium sulfate. The ester was separated from benzene and other impurities by distillation at reduced temperatures. The following formula is believed to represent the molecular structure of the new ester:

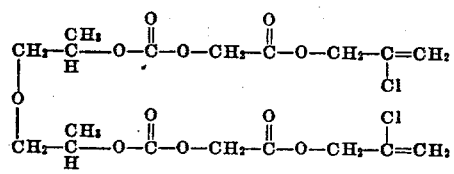

Fifty grams of the new ester was dissolved in 200 cc. of benzene and heated for 3 hours at 60° C. in the presence of 5 grams of benzoyl peroxide. The solution which had increased greatly in its viscosity was then poured into 1000 cc. of methyl alcohol and permitted to stand for six hours. A light colored precipitate was formed which was separated by decantation. After washing with water it was reprecipitated from acetone with 2 percent benzoyl peroxide. Five grams of the solid polymer was heated at 135° C. under pressure of 2000 pounds per square inch. A hard, transparent product was formed.

Although the present invention has been described with respect to certain specific examples, it is not intended that the details thereof shall be limitations upon the scope of the invention except as incorporated in the following claims.

We claim:

1. A compound having the structural formula:

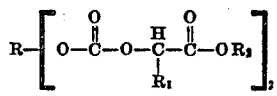

wherein R is a radical corresponding to the radical R in a polyglycol designated by the formula $R(OH)_2$, $R_1$ is a radical selected from the group consisting of hydrogen and alkyl radicals, and $R_2$ is a radical corresponding to the radical $R_2$ in the alcohol $R_2OH$, said alcohol being an unsaturated monohydric alcohol having from 2–10 carbon atoms and having an unsaturated carbon to carbon linkage in an aliphatic chain, said unsaturated linkage being adjacent the beta carbon atom of the alcohol.

2. A compound having the formula:

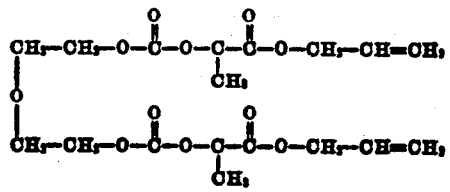

3. A compound having the formula:

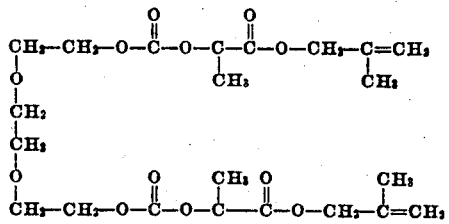

4. A compound having the formula:

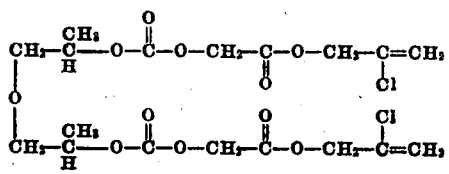

5. A polymer of the compound defined by claim 1.

6. A polymer of the compound defined by claim 2.

7. A polymer of the compound defined by claim 3.

8. A polymer of the compound defined by claim 4.

IRVING E. MUSKAT.
FRANKLIN STRAIN.